Feb. 17, 1953  E. W. MILLER  2,628,537
MULTIPLE SPINDLE GEAR SHAPING MACHINE
Filed July 27, 1946  4 Sheets-Sheet 1

Inventor
Edward W. Miller

Feb. 17, 1953 E. W. MILLER 2,628,537
MULTIPLE SPINDLE GEAR SHAPING MACHINE
Filed July 27, 1946 4 Sheets-Sheet 2

Inventor
Edward W. Miller
by Wright, Brown, Quinby & May
Attys.

Feb. 17, 1953 E. W. MILLER 2,628,537
MULTIPLE SPINDLE GEAR SHAPING MACHINE
Filed July 27, 1946 4 Sheets-Sheet 3

Inventor
Edward W. Miller
by Wright, Brown, Quinby & May
Attys.

Inventor
Edward W. Miller
by Wright, Brown,
Quinby & May
Attys.

Patented Feb. 17, 1953

2,628,537

UNITED STATES PATENT OFFICE 2,628,537

MULTIPLE SPINDLE GEAR SHAPING MACHINE

Edward W. Miller, Springfield, Vt., assignor to The Fellows Gear Shaper Company, Springfield, Vt., a corporation of Vermont Application July 27, 1946, Serial No. 686,603

19 Claims. (Cl. 90—7.5)

The present invention relates to machines for producing gears and other machine elements by the molding generating process; that is, by relative reciprocation between a planing cutter and a work piece and simultaneous rotation of the cutter and work piece for distributing the cutting effect around the perimeter of the work piece and causing generation of prescribed outlines in such perimeter. The embodiment of the invention here illustrated is a machine designed for cutting gears by the use of planing cutters having peripheral teeth with cutting edges at one end arranged in the outline of gear teeth, and for that reason the machine is here entitled, and will generally be called in the following specification, a gear shaping machine. But the same principles are applicable for producing many machine elements and articles other than gears, wherefore such title and descriptive terms are not to be construed as limiting the invention to gear production only, but should be considered as illustrative.

The primary object of the invention is to furnish a machine tool of the character indicated having a multiplicity of cutters and work holders arranged for simultaneous operation and for travel in a path such that all cutters and work holders pass successively, and in rotation, a station where blanks can be placed on the several work holders and finished pieces removed therefrom.

Further objects are to impart reciprocating movement to the cutters of all the individual units by a single central actuator; to combine with means for revolving the operating units an effective and separate means for relieving or separating the work pieces from the cutters upon completion of each cutting stroke; to combine with the foregoing, means for effecting a depth feed between the cutters and work pieces, and separation when the cutting action is completed; and to provide for disposal of chips in an effective manner to avoid interference with the turret or frame by which the generating units are carried. Other objects ancillary to the foregoing appear from the following description in detail of a specific machine embodying the invention.

In the drawings.

Like reference characters designate the same and duplicate parts wherever they appear in all of the figures.

Figure 1:
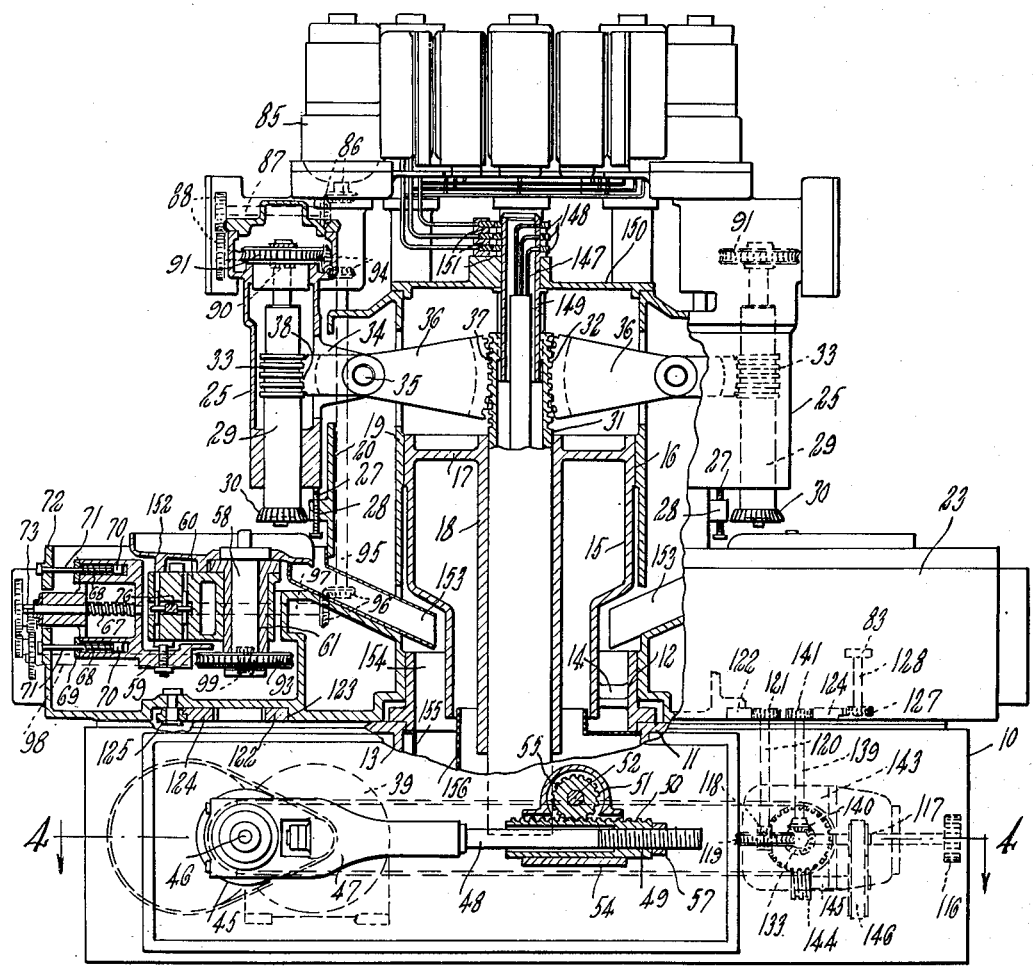
Fig. 1 is a partial vertical section and partial elevation of a multiple spindle gear generating machine embodying this invention.

In this machine ten generating units, each including a reciprocating cutter spindle carrying a gear-like planing cutter, a work holder and means for imparting depth feeding and return movements to the holder and relief movements to the work piece, are mounted on a turret which in turn is rotatably supported by a base.

The base includes a substantially square box structure 10 having interior walls or webs and a top wall 11, and a column 12 supported by the top wall and by a vertical annular wall or partition 13. The column 12 has an external cylindrical bearing surface and is connected by integral webs 14 with an upward extension 15 (the lower end of which is inwardly offset for a purpose presently described), having near its upper end an external cylindrical bearing surface 16 coaxial with the first named bearing surface, and preferably of equal diameter. Connected to the column extension 15 by a wall 17 is a coaxial central guideway 18.

Figure 2:
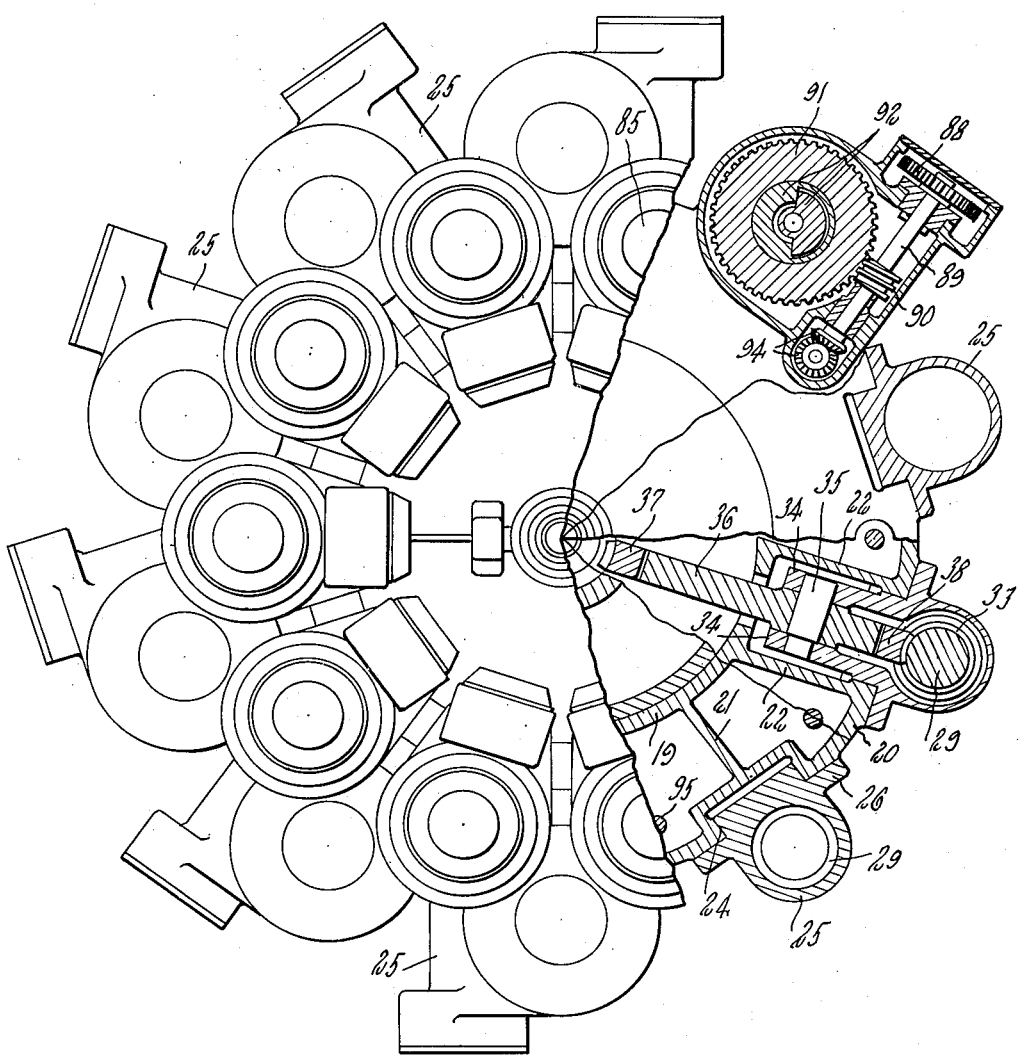
Fig. 2 is in part a plan view of so much of the turret as supports the cutters of the several units, with the carriages and operating means for the cutters thereon, and it includes horizontal sections at different levels through different cutting unit holders.

The turret has a central tubular part 19 which fits rotatably on the bearings 12 and 16, an outer enveloping wall 20 connected with the tubular portion by upright webs 21 and 22 (Fig. 2) and a bottom section 23 which rests on the top wall 11 of the base.

The outer wall 20 of the turret contains upright channels 24 (Fig. 2) in which cutter carriages 25 are mounted with provision for adjustment vertically. These carriages have outwardly projecting lateral flanges 26 which may be secured to the wall by clamping bolts, not shown. Vertical slots to receive the clamping bolts are provided in the flanges to permit vertical adjustment of the several carriages, and they may be adjusted by screws 27, one of which is shown at the left hand side of Fig. 1 threaded through a lug 28 on the turret and bearing against the lower end of the adjacent carriage 25.

Each of the carriages 25 contains a vertically reciprocable cutter spindle 29 which protrudes from the lower end of the carriage and on the protruding end of which a cutter 30 is secured. The cutter spindles of all the units are reciprocated by a common actuator which is here shown as a tubular bar 31 mounted for movement endwise in the guide 18, protruding from the upper end of the guide and having a series of rack teeth 32 encircling its protruding upper end. Each cutter spindle 29 has a series of encircling rack teeth 33 and each cutter carriage is provided with a pair of lugs 34 extending toward the axis of the machine and supporting a pivot 35 on which a lever 36 is mounted to oscillate. The lever has an inwardly extending arm carrying a gear segment 37 in mesh with the teeth 32 of the reciprocable bar 31 and an outwardly projecting arm carrying a gear segment 38 in mesh with the teeth 33 of the spindle. Thus the bar 31 reciprocates all the cutter spindles in unison and the encircling arrangement of its teeth 32 permits the levers 36 to revolve around it, while the encircling teeth 33 of the cutter spindle permit rotation of the latter about their respective axes.

Figure 4:
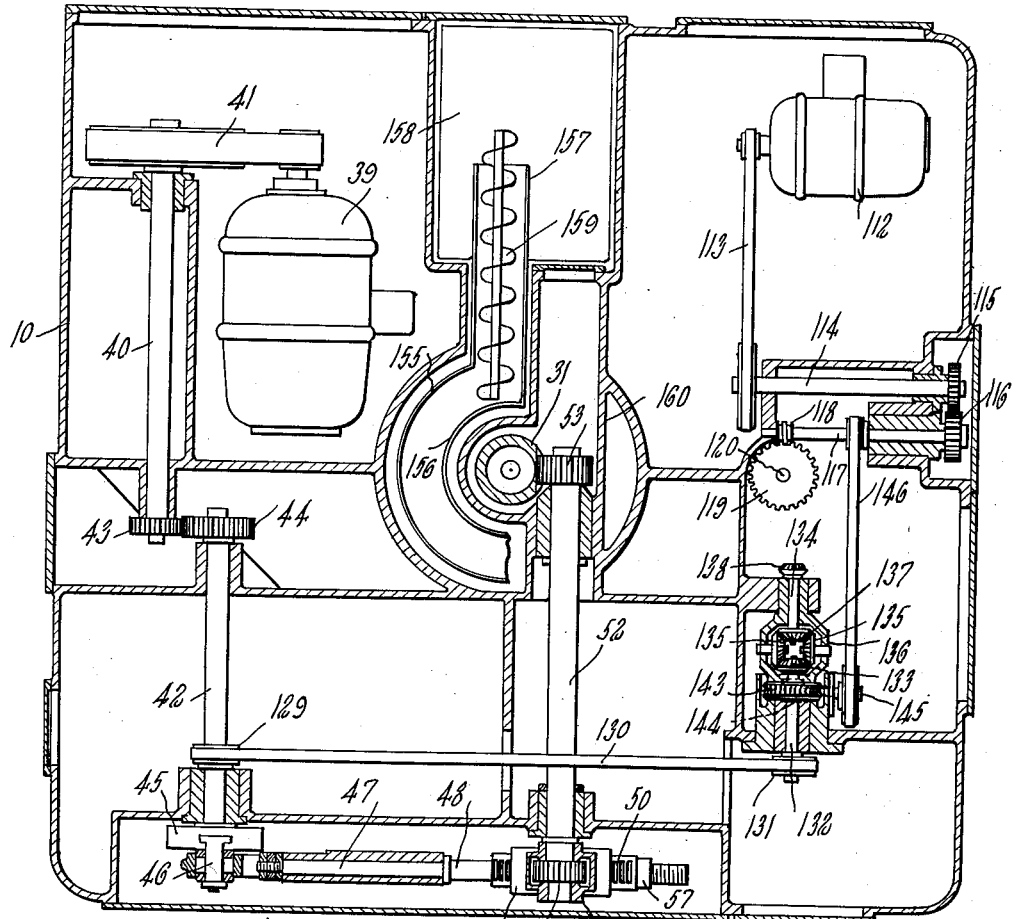
Fig. 4 is a horizontal section through the base of the machine taken on line 4—4 of Fig. 1.

The bar 31 is reciprocated by mechanism driven from an electric motor 39 in the base. This motor rotates a shaft 40 by means of a belt or chain drive 41, and shaft 40 drives a crank shaft 42 through a pair of changeable gears 43, 44 (Fig. 4). These shafts are mounted in bearings supported by internal walls of the base. Shaft 42 has a crank head 45 on its outer end in which is a radial slot containing an adjustable crank pin 46 embraced by a yoke 47 from which a rod 48 extends. A sleeve 49 (Fig. 1) on rod 48 has a series of rack teeth 50 meshing with a gear 51 on a rock shaft 52 which carries also a gear 53 meshing with rack teeth on one side of the lower end of bar 31 which protrudes from the guide 18. The rack sleeve 49 is confined in a guide 54 suspended from shaft 52 by a yoke 55 which has a rotative bearing on the shaft, and encloses gear 51. The rack sleeve can be adjusted endwise on rod 48, with which it has threaded connection, by rotating the rod whereby to control the position of the cutter strokes, while adjustment of the crank pin 46 governs the length of these strokes. A lock nut 57 on the rod prevents accidental rotation thereof.

Figure 3:
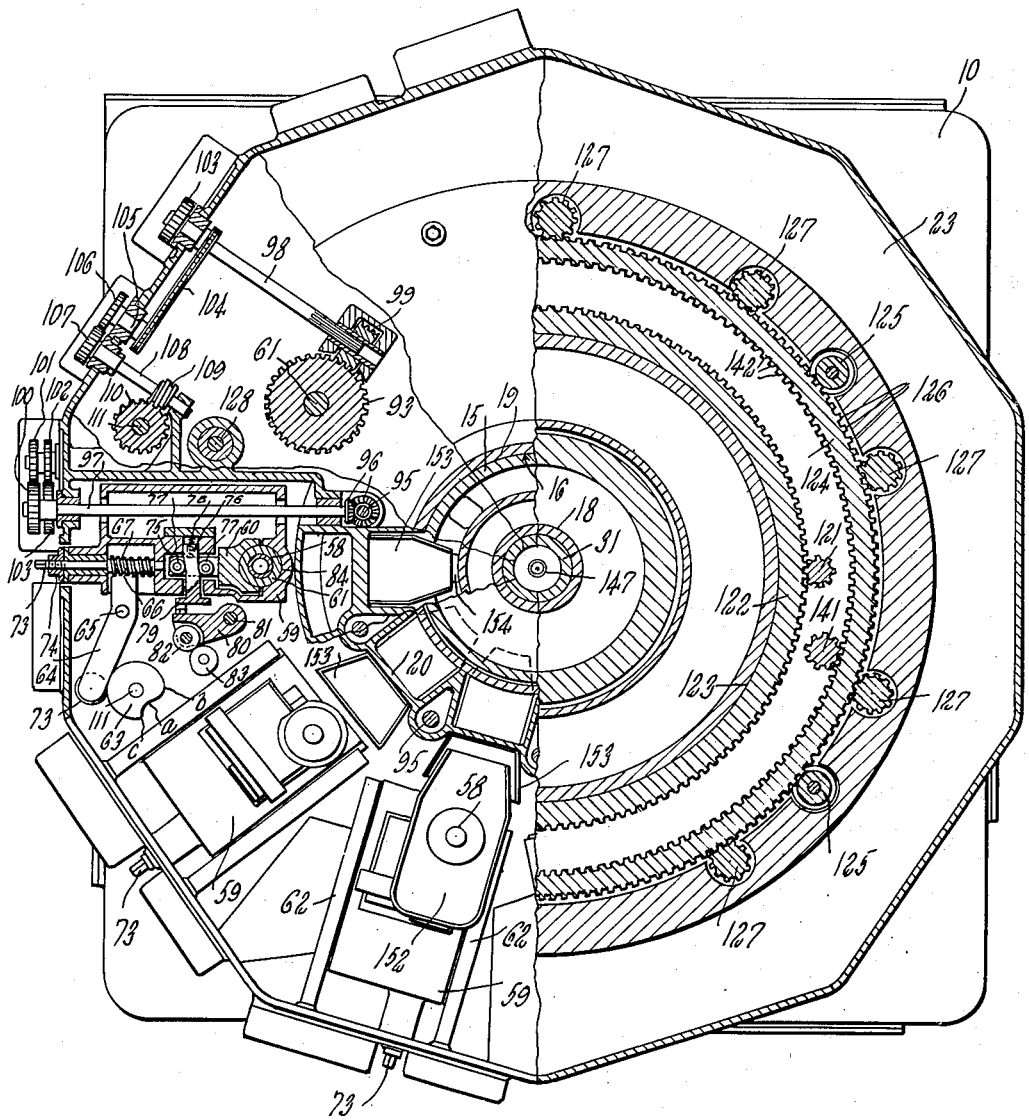
Fig. 3 is a composite horizontal sectional view of the work holding part of the turret and operating means therefor, sections being taken at different levels through different ones of the work holding units.

Each shaping unit includes a work spindle 58 mounted in a carriage 59 by means of a sub-carriage or slide 60 and a quill 61 secured to the sub-carriage, in which the spindle is rotatably mounted. In the description which follows of structure and operating means, reference is made to the parts of different work carriages and the operating means therefor and for different cutter spindles, shown in Figs. 2 and 3. Different portions of these figures show cross sections of various carriages and their operating means at different levels, the sections of some units showing parts which do not appear in the sections of other units. But all parts of each unit are duplicated in all the other units.

The several work carriages 59 are mounted in guides 62 so disposed that the carriages may move radially of the turret beneath the respective cooperating cutter carriages 25 so as to alter the center distance between the work spindle 58 and cutter spindle 29 in each unit. Each work carriage is so moved by a depth feed cam 63 rotatably mounted in the bottom part 23 of the turret acting on one arm of a lever 64, which turns about a pivot 65 mounted on the turret bottom. A second arm of lever 64 carries a gear segment 66 which meshes with a worm or helical rack 67 mounted on the carriage. These operating parts for one of the work carriages are shown in plan view in Fig. 3. Springs 68 are disposed between abutments 69 on the carriage and enlargements 70 on rods 71 which are anchored to the outer wall 72 of the turret in an arrangement which tends to force the carriage outward, as shown in Fig. 1, and causes a roller 73 on the outer arm of lever 64 to bear constantly on the circumference of the depth feed cam 63. The springs 68, tension rods 71 and helical rack 67 are all parallel to the guideways 62 and preferably are in the same plane with the axes of the cutter and work spindles.

The depth feed cam has a rise from the point $a$ to the point $b$ disposed to advance the work carriage toward the cutter spindle and feed the work spindle to the point where the cutter teeth enter the work piece to the required depth, a dwell from the point $b$ to the point $c$, which holds the carriage in the same location while the spindles rotate to continue the cutting action around the circumference of the work piece, and a drop from $c$ to $a$ which allows the carriage to be retracted by springs 68 when the work piece is finished. The helical rack 67 is rotatably mounted in the carriage and has a protruding shaft extension 731 adapted to be rotated manually with the aid of a wrench to adjust the carriage relative to the above described depth feeding mechanism so as to obtain any desired depth of cut. A lock nut 74 on the shaft extension is provided to secure the various adjustments of the helical rack.

The sub-carriage or slide 60 is provided, and is moved back and forth in time with the strokes of the cutter spindle, to hold the work in cutting position while cutting strokes are performed and back it off from the cutter to prevent rubbing thereof when the cutter makes its return strokes. Hence the sub-carriage 60 may be considered as a cutter relief slide.

It has an extension contained in a guideway 75 in the carriage 59 and is moved back and forth by a relief bar 76 which is reciprocable in a transverse guideway in the carriage and passes between, and in contact with, two rollers 77 carried by the relief slide. It is pressed outward by a spring 78, reacting against an abutment on the carriage, and its outer end bears against, and has sliding engagement with a shoe 79 which is coupled with a transmission lever 80. This lever is pivoted at 81 to the turret and carries a follower roll 82 bearing on a relief cam 83. Rotation of this cam thus causes the relief bar 76 to be moved back and forth. This bar is offset between its ends, having wedge or cam surfaces of equal inclination at opposite sides, of which the one that faces toward the center of the turret causes the relief slide 60 to hold quill 61 against a bearing surface 84 on the carriage, and the opposite wedge surface causes the quill (which is suitably fastened to the relief slide), to be withdrawn from said bearing. The relief cam is rotated by means later described, in time with the reciprocations of the cutter spindle and has a high and a low dwell suitably disposed to hold the work spindle in its operative and relieved positions while the cutter performs its working and return strokes, respectively.

The bearing surface on the wedge bar 76 which is engaged by shoe 79 extends in parallel with the path of the work carriage through a distance and in a location such that bearing contact of the shoe is maintained through the full range of adjustment and depth feeding movements of the work carriage.

The spindles and depth feed cam of each generating unit are rotated in prescribed ratios by an electric motor 85 mounted on the upper end of the cutter carriage. A bevel gear pair 86 (Fig. 1) driven by the motor rotates a shaft 87 which, through change gears 88, drives a worm shaft 89 and a worm 90 (Fig. 2) meshing with a worm wheel 91 coaxial with the cutter spindle 29 and with which the spindle has endwise sliding engagement through guides or splines 92 which transmit rotation from the wheel to the spindle.

Figure 5:
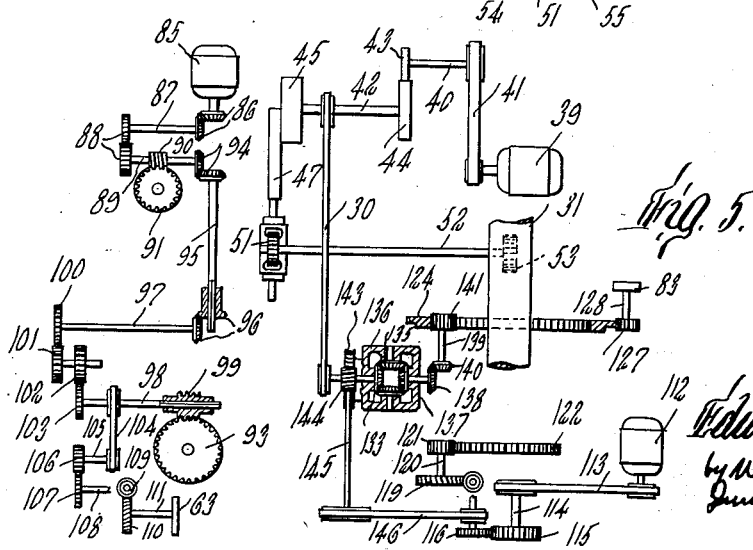
Fig. 5 is a diagrammatic view of the mechanism by which the moving parts are driven.

The work spindle carries a worm wheel 93 which is driven from the upper worm shaft 89 by a bevel gear pair 94, an upright shaft 95, bevel gear pair 96, a horizontal shaft 97, a shaft 98 parallel to, and located beneath, shaft 97 on which a worm 99 is mounted in mesh with worm wheel 93, and a train of change gears 100, 101, 102 and 103, of which the first is mounted on the shaft 97 and the last on shaft 98, the intermediate gears being coupled together and rotatably mounted on a stud shaft. The upright shaft 95 has splined sliding engagement with one of the transmission gears 96, or may be of telescopic construction, and shaft 98 is splined to worm 99 (Figs. 3 and 5), to permit the adjusting and depth feeding movements of the cutter and work carriages.

The depth feed cam 63 is driven from shaft 98 (Fig. 3) by a sprocket and chain gearing 104, a shaft 105, change gears 106 and 107, and a worm shaft 108, on which the change gear 107 is mounted, carrying a worm 109 in mesh with a worm wheel 110 on an upright shaft 111 to which the cam 63 is secured.

For rotating the turret an electric motor 112 (Fig. 4) is mounted in the base and coupled by a sprocket and chain drive 113 with a shaft 114 carrying a change gear 115 in mesh with a change gear 116 on a shaft 117. A worm 118 is secured to the shaft 117 and meshes with a gear 119 on an upright shaft 120. This driving train is mounted in the box portion of the base and the shaft 120 rises through the top wall 11 of the base and carries a gear 121 in mesh with a large ring gear 122 which surrounds a shoulder 123 on the under side of the turret, concentric with the axis of rotation of the turret, and is secured thereto.

A ring gear 124 for driving the relief cams 83 is mounted coaxial with the turret and the ring gear 122, being supported and centered by a circular series of bearing rolls 125 which are connected by pivots to the bottom wall of the turret, as shown in Fig. 1. Ring gear 124 has a series of external teeth 126 (Fig. 3) meshing with pinions 127 on shafts 128 (Fig. 1) which are carried rotatably by the turret and to which the respective work relief cams 83 are secured. Ring gear 124 is driven from the crank shaft 42 (which also reciprocates the cutter spindles as previously described) so that its timing will accord with the strokes of the cutter spindle, and is given an increment of rotation by the turret driving mechanism to compensate for the planetary travel of the generating units. The driving trains are shown in Figs. 1 and 4. A sprocket or gear 129 on the crank shaft 42 drives, through a chain 130, a sprocket or gear 131 on a shaft 132. A bevel gear 133 on the last named shaft forms part of a differential gearing which rotates a shaft 134, alined with shaft 132, by means of intermediate gears 135 carried by a housing or cage 136, and a gear 137 on shaft 134. A bevel gear 138, also on shaft 134, drives an upright shaft 139 by means of a bevel gear 140, and shaft 139 carries on its upper end a gear 141 in mesh with internal teeth 142 on ring gear 124.

The differential housing or cage is mounted in bearings in the base and carries a worm gear 143 with which a worm 144 is meshed. Worm 144 is carried by a shaft 145 which is in driven connection with shaft 117 by a chain or link belt 146 and sprockets or gears on the shaft 117 and 145, respectively.

In the present embodiment the gear ratios between the crank shaft 42 and relief cam 83 are such that, if the differential housing were held stationary, the cams would rotate once for each revolution of the crank shaft, and each cam has a high dwell and a low dwell, each occupying nearly half of the circumference, with short eccentric connecting portion. The ratio of worm 118 to gear 119 is equal to the ratio of worm 144 to gear 143, and the ratio of the sprockets or gears on shafts 117 and 145 is one to two. The ratios of driving gear 121 to the ring gear 122 and of driving gear 141 to ring gear 124 are equal. Hence the turret rotating shaft 117 would impart rotation to the ring gear 124 at a rate equal to that of the turret, and in the same direction, if the shaft 132 were held stationary. When both shafts 42 and 117 are rotated in the operation of the machine, the rotation of the ring gear due to shaft 117 is superimposed on that due to crank shaft 42.

In some circumstances, as when other driving ratios and other designs of relief cam are used, the rotation of the ring gear 124 may be in the opposite direction to that of the turret. When in the same direction, the incremental rotation caused by the turret driving mechanism is added to that imparted by the rock shaft, and when in the opposite direction it is subtracted, being then a negative increment.

Current for the motors 85, which revolve with the turret, is supplied by conductors 147 passing from the base through the tubular bar 31 and connected to commutator rings which are secured to a stationary tube 149 with suitable insulation. This tube passes through a top plate 150 on the central tubular column of the turret and is prevented from rotating by having a splined engagement with the interior of the actuating bar. Brushes 151 are mounted on the plate 150 to bear on the commutator rings, and are connected by suitable conductors with starters and switches for the several motors.

A novel means for disposing of chips and lubricant or coolant is provided in this machine. A pan 152 is mounted on the relief slide of each work carriage closely surrounding the work spindle to catch the chips and lubricating fluid, and the outlet of the pan is directed toward the axis of the turret and discharges into a chute 153 which leads into the annular space between the post 12 of the base and the contracted lower end of the extension 15. Channels 154 are provided between the connecting webs 14 of the post to permit flow of discharged matter into an annular chamber between partition walls 155, 156 in the base. An outlet conduit 157 leads thence to a space in which a chip pan 158 is placed and may contain a screw conveyer 159 rotated by any suitable means. Shaft 52 and pinion 53 are enclosed in a housing 160 which prevents refuse matter from coming in contact with them.

It will be noted that the various sets of change gears described in this specification are located in housings and spaces which have removable covers and in which the gears are easily accessible.

Other values than the specific ones hereinbefore stated, and various modifications in construction, arrangement and operation of the parts of the machine may be made in accordance with the principles of this invention and within the scope of the appended claims.

What I claim is:

1. A multiple spindle shaping machine comprising a base, a turret mounted to rotate on said base, means for rotating said turret, a plurality of shaping units mounted on the turret, each unit comprising a rotatable cutter spindle and a rotatable work spindle, one of said spindles being reciprocable endwise, means associated with each of said units and independent of the other units for rotating the spindles thereof simultaneously at a prescribed speed ratio, and common means for reciprocating in unison the reciprocable spindles of all the units.

2. A shaping machine as set forth in claim 1, in which the means for reciprocating the spindles includes a bar mounted at the axis of the turret, means for moving said bar back and forth along said axis, and transmission means from said bar to all of the reciprocable spindles.

3. A machine tool according to claim 1, in which the reciprocable spindles of the several units are mounted in parallel with the axis of the turret and the means for reciprocating them comprises a bar mounted for movement back and forth along the axis of the turret having a series of encircling rack teeth and levers pivotally connected with the respective units, each having an arm in mesh with said teeth and a second arm in engagement with one of the reciprocable spindles for imparting reciprocating movement thereto.

4. A machine tool as set forth in claim 1, combined with an annular receptacle for chips, etc. surrounding the axis of the turret at a lower level and nearer to said axis than the shaping units and pans located with respect to the spindles of each of the shaping units to receive the chips produced by the cutting action, having discharge chutes directed downwardly toward the turret axis and terminating over said annular receptacle.

5. A multiple machine tool for performing cutting operations comprising a base, a turret mounted rotatably on said base, a plurality of cutter holding and work holding elements mounted on the turret in cooperative relation to constitute units for transforming blank work pieces into finished articles, means associated with each of said units for receiving the chips produced by cutting action, and a common receptacle for chips coaxial with the turret, said receiving means being disposed to discharge the chips received thereby into said receptacle.

6. A multiple machine tool comprising a base, a turret rotatably mounted on the base, a plurality of cutter spindles and work holders mounted on the turret in association to constitute a plurality of cutting units, the work holder of each unit including a relief slide relatively movable to withdraw the work from the cutter when return strokes are performed, common means for reciprocating the cutter spindles of different units, and common means for causing the relief slides of the several units to be moved back and forth in time with the strokes of the cutter to hold the work in cutting position during cutting strokes and in a position clear of the cutter during return strokes.

7. A multiple machine tool comprising a base, a turret rotatably mounted on the base, a plurality of working units mounted on the turret, each including a reciprocable cutter spindle adapted to carry a cutter, a work carriage movable to alter the distance between the cutter spindle and a work piece mounted on said work carriage, a depth feed cam mounted on the turret in association with each work holder, transmission means by which said cam in its movement relative to the turret causes displacement of the work carriage, common means for reciprocating the cutter spindles of the several units, and common means for actuating the depth feed cams of the several units.

8. A multiple machine tool comprising a base, a turret rotatably mounted on the base, a plurality of working units mounted on the turret, each including a reciprocable cutter spindle adapted to carry a cutter, a work carriage movable to alter the distance between the cutter spindle and a work piece mounted on said work carriage, a relief slide mounted on said carriage having means for holding a work piece and being movable relative to the carriage for shifting the work piece in time with strokes of the cutter spindle to avoid rubbing contact of the cutter with the work piece during non cutting strokes, a depth feed cam and a relief cam mounted on the turret in association with each work carriage, transmission means between said depth feed cam and the carriage for moving the carriage bodily pursuant to movement of the depth feed cam, transmission means between the relief cam and the relief slide for moving the latter relatively to the carriage in consequence of movements of the relief cam, common means for reciprocating the cutter spindles of the several units, common means for driving the depth feed cams of the several units, and common means for driving the relief cams of the several units.

9. A machine tool as set forth in claim 8, in which the means for driving the relief cams includes a differential gearing connection to compensate for rotation of the turret in timing the actions of the relief cams with the strokes of the cutter spindle.

10. A machine tool as set forth in claim 8, combined with driving mechanism for rotating the turret and means actuated by said driving mechanism for imparting an increment of movement to the relief cams proportional to the rotation of the turret.

11. A machine tool comprising a base, a turret rotatably mounted on said base, a reciprocable cutter spindle mounted on the turret adapted to carry a cutting tool, means in the base coupled with said spindle for reciprocating it, driving means in the base for imparting rotation to the turret, a work holder mounted on the turret including a relief slide having means for holding a work piece and being movable back and forth to hold such work piece clear of the cutter when non cutting strokes are performed, and to hold the work piece in operative position when cutting strokes are performed, a relief cam mounted on the turret operatively associated with the relief slide to cause the work piece to be so moved, means operated by the spindle driving mechanism for driving said cam in time with strokes of the spindle, and means actuated by the turret rotating driver for imparting incremental movement to the cam proportional to the rotation of the turret.

12. In a multiple machine tool, the combination of a base, a turret rotatably mounted on the base, a plurality of work carriages mounted on the turret, relief slides mounted on the several carriages having means for holding work pieces, relief cams mounted on the turret in association with the several work carriages, transmission means operable by the several relief cams for imparting back and forth movements to said relief slides, a ring gear coaxial with the turret in geared driving connection with the several relief cams, and means held by the base for rotating said ring gear.

13. The machine tool combination set forth in claim 12, combined further with reciprocable cutter spindles associated with the respective work carriages, a driving mechanism held by the base for reciprocating the cutter spindles, and means operated conjointly thereby and by the turret rotating means for imparting movement to said ring gear.

14. In a machine tool, the combination with a base and a turret mounted to rotate on the base, of driving mechanism coupled with said turret for rotating it, a reciprocable spindle carried by the turret, driving mechanism held by the base for imparting reciprocation to said spindle, a machine part mounted on the turret movable toward and away from the path of reciprocation of said spindle, a gear coaxial with the turret and rotatable independently thereof, means actuated by said gear for causing movements of said machine part, and differential mechanism operated conjointly by the before named driving means for imparting rotation to said gear.

15. In a machine tool, the combination with a base and a turret mounted to rotate on the base, of driving mechanism coupled with said turret for rotating it, a reciprocable spindle carried by the turret, driving mechanism held by the base for imparting reciprocation to said spindle, a machine part mounted on the turret movable toward and away from the path of reciprocation of said spindle, a gear coaxial with the turret and rotatable independently thereof, means actuated by said gear for causing movements of said machine part, a shaft in driven geared connection with the second named driving mechanism, a second shaft in alinement with the before named shaft in geared driving connection with the before named gear, transmission gears on said shafts, intermediate gears meshing with said transmission gears and supported for planetary movement about the axis of said shafts, and means actuated by the first named driving mechanism for imparting planetary movement to said intermediate gears.

16. In a machine tool, the combination with a cutter holder and a work holder, one of which is movable relative to the other to alter the distance between a cutter and a work piece supported by the respective holders, of a rotatable worm element mounted on said movable holder with its axis extending in the direction of movement of said holder, and means for moving the holder back and forth including a machine element meshing with said worm and mounted for movement lengthwise thereof at its point of engagement therewith, rotation of said worm being adapted to adjust the carriage relative to said machine element.

17. In a machine tool, the combination with a cutter holder and a work holder, one of which is movable relative to the other to alter the distance between a cutter and a work piece supported by the respective holders, of a rotatable worm element mounted on said movable holder with its axis extending in the direction of movement of said holder, and means for moving the holder back and forth including a rotatable cam and a lever having one arm in engagement with said cam and another arm provided with gear teeth in mesh with said worm, the second named arm being movable in a path which, at the point of engagement of the arm with the worm, is parallel to the axis of the worm; rotation of the worm causing the carriage to be adjusted relative to said cam and lever.

18. In a machine tool, a base, a turret rotatably mounted on the base, means for rotating the turret, a shaping unit mounted on the turret comprising a rotatable cutter spindle, a rotatable work spindle, one of said spindles being movable axially, a carriage holding the other spindle and being movable in a path transverse to the first spindle, a driving element mounted and movable coaxially of the turret coupled with said reciprocable spindle for imparting reciprocating movement thereto, an electric motor carried by said shaping unit, mechanism actuated by said motor for rotating the spindles at a prescribed speed ratio, electric conductors passing through the base and turret along the axis of the latter, and relatively slidable contact members connected with said conductors and motor, respectively, for supplying the motor with current while the turret rotates.

19. In a machine tool, a base, a turret rotatably mounted on the base, means for rotating the turret, a shaping unit mounted on the turret comprising a rotatable cutter spindle, a rotatable work spindle, one of said spindles being movable axially, a carriage holding the other spindle and being movable in a path transverse to the first spindle, a depth feed cam mounted on the turret and operatively engaged with said carriage for so moving it, a motor mounted on said unit, correlated gearing driven by said motor for rotating said spindles and cam at prescribed speed ratios, a driving element located and reciprocable in the axis of the turret, and transmission means between said driving element and the reciprocable spindle for imparting reciprocating movement to the spindle.

EDWARD W. MILLER.

REFERENCES CITED

The following references are of record in the file of this patent:

UNITED STATES PATENTS

| Number | Name | Date |
|---|---|---|
| 321,698 | Eberhardt | July 7, 1885 |
| 381,108 | Brainard | Apr. 17, 1888 |
| 1,621,223 | Schurr | Mar. 15, 1927 |
| 1,649,109 | Gifford et al. | Nov. 15, 1927 |
| 1,732,700 | Sommer et al. | Oct. 22, 1929 |
| 1,923,781 | Flanders | Aug. 22, 1933 |
| 2,029,398 | Sykes | Feb. 4, 1936 |
| 2,075,489 | Warner et al. | Mar. 30, 1937 |
| 2,129,858 | Miller | Sept. 13, 1938 |
| 2,156,153 | Groene et al. | Apr. 25, 1939 |